US006813770B1

(12) United States Patent
Allavarpu et al.

(10) Patent No.: US 6,813,770 B1
(45) Date of Patent: Nov. 2, 2004

(54) ABSTRACT SYNTAX NOTATION TO INTERFACE DEFINITION LANGUAGE CONVERTER FRAMEWORK FOR NETWORK MANAGEMENT

(75) Inventors: Sai V. Allavarpu, Pleasanton, CA (US); Rajeev Angal, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/557,069

(22) Filed: Apr. 21, 2000

(51) Int. Cl.$^7$ .............................. G06F 9/00; G06F 9/46
(52) U.S. Cl. ...................................... 719/316; 719/331
(58) Field of Search ................................ 709/316, 315, 709/332, 331, 224, 223, 202; 707/103 R; 719/316, 315, 332, 331

(56) References Cited

U.S. PATENT DOCUMENTS

| | | | |
|---|---|---|---|
| 5,406,557 A | 4/1995 | Baudoin | |
| 5,452,459 A | 9/1995 | Drury et al. | |
| 5,511,122 A | 4/1996 | Atkinson | |
| 5,586,260 A | 12/1996 | Hu | |
| 5,632,032 A | 5/1997 | Ault et al. | |
| 5,647,002 A | 7/1997 | Brunson | |
| 5,708,780 A | 1/1998 | Levergood et al. | |
| 5,732,270 A | * 3/1998 | Foody et al. | ............... 709/316 |
| 5,941,978 A | 8/1998 | Finni | |
| 5,848,243 A | 12/1998 | Kulkarni et al. | |
| 5,870,749 A | 2/1999 | Adusumilli | |
| 5,892,950 A | 4/1999 | Rigori et al. | |

(List continued on next page.)

OTHER PUBLICATIONS

N. Lynch, "Web Enabled TMN Manager", IEEE, Mar. 1998, pp. 121–126.*
G. Genilloud, "Analysis of the OSI System Manager Architecture fron an ODP Perspective", IEEE, 1996, pp. 72–81.*

"What is CORBA?," Object Management Group, Inc., 1997–1999, 2 pages.
"CORBA Overview," Object Management Group, Inc., 1995, 13 pages.
"Overview of CORBA," Object Management Group, Inc., Jan. 19, 2000, 4 pages.
"Java, RMI and CORBA," Object Management Group, Inc., 1997–1999, 8 pages.
"A CORBA Primer," Technical Overview, A White Paper, Segue Software, 7 pages.
"Development Environment," Sun Microsystems, Inc., 1994–2000, 11 pages.

(List continued on next page.)

Primary Examiner—Sue Lao
(74) Attorney, Agent, or Firm—Robert C. Klowert; Meyertons, Hood, Kivlin, Kowert & Goetzel, P.C.

(57) ABSTRACT

A system and method for managing network devices. The framework may provide a suitable system for managed object data type conversions between various data description languages, such as an interface definition language (e.g., OMG IDL) and an abstract syntax notation (e.g., ASN1). This conversion facility may be used in both request and event network traffic, so common libraries may be used. Two separate libraries may be used: a converter framework library and a converter implementation library. The framework library provides a collection classes that may be used by the clients of the converter libraries. Most classes in the converter framework library are handle classes (or wrappers) to the real implementation (or body) classes in the converter implementation library. Framework classes hide the details of the real implementation classes and provide a simple, consistent interface to any data type converter via IDL. The converter implementation library provides the implementation needed by the framework to function properly, and may allow various different mappings to be used easily by implementing them as plug-in modules. The combination of using IDL and generic typing provides an efficient, generic solution to mapping data types across multiple platforms, multiple programming languages, and multiple object classes.

30 Claims, 6 Drawing Sheets

U.S. PATENT DOCUMENTS

| | | | |
|---|---|---|---|
| 5,953,530 A | | 9/1999 | Rishi et al. |
| 5,974,438 A | | 10/1999 | Neufeld |
| 5,983,233 A | * | 11/1999 | Potonniee ............... 707/103 R |
| 5,987,440 A | | 11/1999 | O'Neil et al. |
| 6,018,743 A | * | 1/2000 | Xu ......................... 707/103 R |
| 6,023,579 A | | 2/2000 | Hellgren et al. |
| 6,042,614 A | | 3/2000 | Davidson et al. |
| 6,085,240 A | | 7/2000 | Suzuki et al. |
| 6,176,883 B1 | | 1/2001 | Holloway et al. |
| 6,199,068 B1 | * | 3/2001 | Carpenter .................. 707/100 |
| 6,202,199 B1 | | 3/2001 | Wygodny et al. |
| 6,205,482 B1 | | 3/2001 | Navarre et al. |
| 6,208,345 B1 | | 3/2001 | Sheard et al. |
| 6,209,018 B1 | | 3/2001 | BenShachar et al. |
| 6,247,039 B1 | | 6/2001 | Callsen |
| 6,282,579 B1 | | 8/2001 | Carre |
| 6,282,701 B1 | | 8/2001 | Wygodny et al. |
| 6,289,393 B1 | | 9/2001 | Phillips et al. |
| 6,317,428 B1 | | 11/2001 | Mercouroff et al. |
| 6,321,337 B1 | | 11/2001 | Reshef et al. |
| 6,324,648 B1 | | 11/2001 | Grantges, Jr. |
| 6,330,598 B1 | | 12/2001 | Beckwith et al. |
| 6,343,332 B1 | | 1/2002 | Ueda |
| 6,356,930 B2 | | 3/2002 | Garg |
| 6,356,957 B2 | * | 3/2002 | Sanchez et al. ............. 719/328 |
| 6,363,421 B2 | | 3/2002 | Barker et al. |
| 6,378,124 B1 | | 4/2002 | Bates et al. |
| 6,378,125 B1 | | 4/2002 | Bates et al. |
| 6,445,776 B1 | | 9/2002 | Shank et al. |
| 6,467,052 B1 | | 10/2002 | Kaler et al. |
| 6,496,833 B1 | | 12/2002 | Goldberg et al. |
| 6,530,079 B1 | | 3/2003 | Choi et al. |
| 6,539,501 B1 | | 3/2003 | Edwards |

OTHER PUBLICATIONS

"Solstice Enterprise Manager 2.1 Reviewr's/Evaluator's Guide for Telecommunications Network Management," Sun Microsystems, Inc., 1998, pp. 1–45.

"Solstice Enterprise Manager 2.1: A Technical White Paper,", Sun Microsystems, Inc. Chapters 1–6, 68 pages, 1997.

"Solstive Enterprise Manager 3.0: Satisfying the Needs of Telecom Carriers & Service Providers," Sun Microsystems, Inc., 1994–2000, 3 pages.

"Joint Inter Domain Management (JIDM)," The Open Group, Jan. 10, 2000, 5 pages.

"Specification of Abstract Syntax Notation One (ASN.1)," International Telecommunications Union, ITU–T Recommendation X.208, 1988 and 1993, pp. 1–72.

"Specification of Basic Encoding Rules for Abstract Syntax Notation One (ASN.1)," International Telecommunication Union, ITU–T Recommendation X.209, 1988 and 1993, pp. 1–23.

"Inter–Domain Management: Specification Translation,", The Open Group, 1997, 281 pages.

"CORBA–Based Telecommunication Network Management Systems," Object Management Group, Inc., May 1996, pp. 1–29.

"Intelligent Networking with CORBA, *A White Paper*," Nortel, et al., Draft 2.0, Oct. 31, 1996, pp. 1–7.

"Inter–Domain Management Between CORBA and SNMP: WEB–Based Management–CORBA/SNMP Gateway Approach," Subrata Mazumdar, Lucent Technologies, 1996, pp. 1–16.

"Mapping of Common Management Information Services to CORBA Objects Services Specification," Subrata Mazumdar, Lucent Technologies, Mar. 10, 1997, pp. 1–68.

"A Discussion of the Object Management Architecture," Object Management Group, Inc., Jan. 1997, pp. 1–1 to 1–6, 2–1 to 2–6, 3–1 to 3–8, 4–1 to 4–12, A–1 to A–8.

"CMIS/C++: Application Programming Interface," Network Management Forum, Issue 1.0, Feb. 1998, pp. 1–226.

"JIDM Interaction Translation," Final Submission to OMG's CORBA/TMN Interworking RFP, Object Management Group, Inc., Edition 4.3, OMG Document Number: telecom/98–10–10, Oct. 1998, 273 pages.

* cited by examiner

ABSTRACT SYNTAX NOTATION TO INTERFACE DEFINITION LANGUAGE CONVERTER FRAMEWORK FOR NETWORK MANAGEMENT

BACKGROUND OF THE INVENTION

1. Field of the Invention

The present invention relates generally to computer software. More particularly, the present invention relates to network management software.

2. Description of the Relevant Art

The field of network management involves the management of networked devices, often remotely. A computer network is a linked group of two or more computers. Generally, networks may be classified as Local-Area Networks (LANs) or Wide-Area Networks (WANs). In a LAN, the computers or devices are typically connected together within a "local" area such as a home, office, or group of offices. In a WAN, the computers or devices are typically separated by a greater distance and are often connected via telephone/communication lines, radio waves, or other suitable means of connection.

Networks are usually classified using three properties: topology, protocol, and architecture. Topology specifies the geometric arrangement of the network. Common topologies are bus, ring, and star configurations. A network's protocol specifies a common set of rules and/or signals, such as Ethernet or Token Ring, that the networked devices use to communicate with each other. A network's architecture typically specifies one of the two major types of network architecture: peer-to-peer or client/server. In a peer-to-peer networking configuration, there is no server, and computers simply connect with each other in a workgroup to share files, printers, services, and Internet access. Client/server networks often include a domain controller to which all of the networked computers log on. This server may provide various services such as centrally routed Internet access, e-mail, file sharing, printer access, and security services.

Many types of devices may be managed over a network, such as printers, scanners, phone systems, copiers, and many other devices and appliances configured for network operation. Managing such devices tends to require that the data types of each device's control parameters and signals be well defined. For example, a networked printer might have a Boolean status parameter that indicates whether the device is currently on or off and a control parameter which turns the printer on or off. The printer may also be capable of generating an alert signal indicating, for example, that the toner level is low. The network management software should be able to read and write these data correctly in order to manage the device. To do this, information about the data is required. Such information is referred to as metadata, or "data about data." Metadata may typically describe what type of data (string, integer, Boolean, structure) an object has and how the data are formatted. Metadata is essential for understanding information related to managed devices, as well as information stored in data warehouses. Typically, network management software manages a given device by storing and manipulating a representation of its pertinent data as a software object, herein referred to as a "managed object." This object is the virtual representation of the device on the network.

Figure 1A:
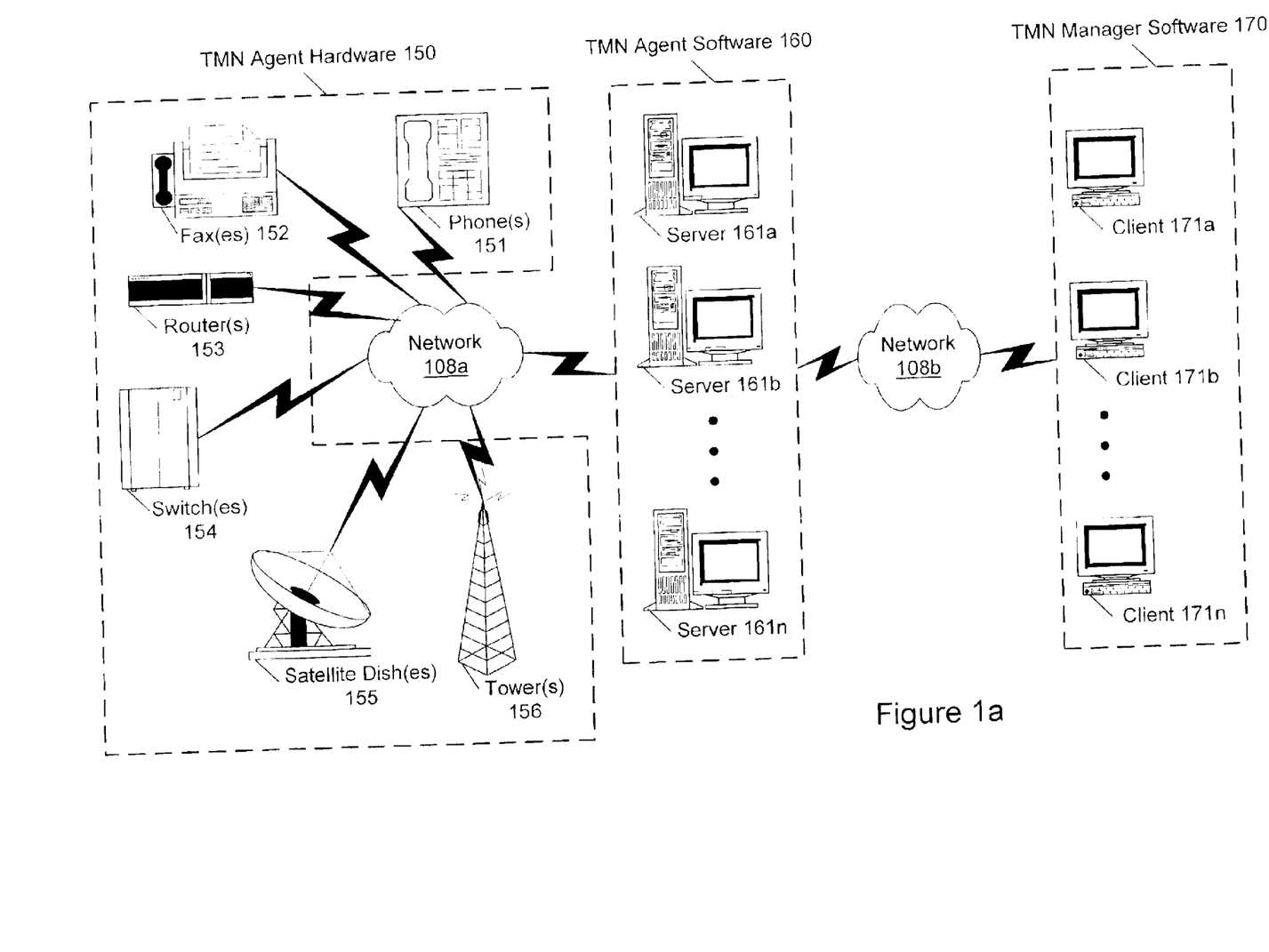
FIG. 1a illustrates an example of typical elements of a telecommunications network.

FIG. 1a illustrates an example of typical elements of a telecommunications network. The telecommunications world is characterized by devices such as cell phones, cell phone towers and other kinds of towers 156, phone systems 151, faxes 152, routers 153, switches 154, satellite dishes 155, etc., which may be interconnected via networks 108a. In response to the network management needs of this technology sector, a conceptual framework for telecom network management called Telecommunications Management Network (TMN) was developed by the TeleManagement Forum (TMF). TMN defines the relationship between basic network building blocks, such as network elements, different network protocols, and operations systems, in terms of standard interfaces. Generally, a TMN system includes Agent hardware 150, Manager software 170, and Agent software 160. The Agent hardware 150 includes the managed devices such as those shown in FIG. 1a. The Manager software 170 includes any application used to manage a networked device. These manager applications, or client applications, may be installed and executed on one or more client computer systems 171a, 171b, . . . , 171n. The Agent software 160 includes the software interface between the Manager software 170 (for communications via network 108b) and the Agent hardware 150 (for communications via network 108a). The Agent software 160 may be installed and executed on one )r more server computer systems 161a, 161b, . . . , 161n. In some instances, the Agent software 160 and Manager software 170 may be installed and executed on the same computer system. The Agent software 160 may also reside, in whole or part, on the Agent hardware 150 itself.

One TMN approach to managing objects over a network is the Simple Network Management Protocol (SNMP), a set of protocols for managing complex networks. SNMP works by sending messages, called protocol data units (PDUs), to different parts of a network. SNMP-compliant devices, called agents, store data about themselves in Management Information Bases (MIBs) and return this data to the SNMP requesters. The metadata used by SNMO to describe managed object data variables includes the variable title, the data type of the variable (e.g. integer, string), whether the variable is read-only or read-write, and the value of the variable. SNMP works over the TCP/IP (Transport Control Protocol/ Internet Protocol) communication stack. SNMP also uses UDP over IP, and also may support TCP over IP. It is widely held, however, that SNMP was developed as a simple "quick fix" and was never intended to be a permanent solution to network management. Consequently, one problem with SNMP is that the information it specifies is neither detailed nor well-organized enough to adequately serve the expanding needs of modern networking.

Another example of a TMN network management protocol is the Common Management Information Protocol (CMIP). In the U.S. the CMIP protocol is primarily run over TCP/IP, while in Europe it is generally run over the OSI (Open Systems Interconnection) communication stack and was designed to replace SNMP and address SNMP's shortcomings by providing a larger, more detailed network manager. Its basic design is similar to SNMP: Management requests, management responses, and notifications are employed to monitor a network. These correspond to SNMP's PDUs. CMIP, however, contains eleven types of messages, compared to SNMP's five types of PDUs.

In CMIP, variables are seen as complex and sophisticated data structures with many attributes. These include: variable attributes, which represent the variable's characteristics (e.g., its data type, whether it is writable); variable behaviors, or the actions of that variable that can be triggered; and notifications, or event reports generated by the variable whenever a specified event occurs (e.g., a terminal shutdown would cause a variable notification event).

As a comparison, SNMP only employs variable attributes and notifications, but not variable behaviors. One of the strongest features of the CMIP protocol is that its variables not only relay information to and from the terminal (as in SNMP), but they can also be used to perform tasks that would be impossible under SNMP. For instance, if a terminal on a network cannot reach its fileserver for a predetermined number of tries, then CMIP can notify the appropriate personnel of the event. With SNMP, a user would need to explicitly keep track of the number of unsuccessful attempts to reach the fileserver. CMIP thus results in a more efficient network management system, as less work is required by a user to keep updated on the status of the network.

A significant disadvantage of the CMIP protocol is that it requires more system resources than SNMP, often by a factor of ten. Thus, any move to CMIP from SNMP requires a dramatic upgrade in network resources. Another disadvantage with CMIP is that it is very difficult to program; the variable metadata includes so many different components that few programmers are generally able to use the variables to their fall potential.

Both of the above protocols have been implemented in a number of programming languages, such as C, C++, and Java™. However, network management software which takes advantage of SNMP or CMIP must be written specifically for the language of the protocol implementation. In other words, SNMP-based and CMIP-based network management software is dependent upon a particular programming language and protocol implementation.

A middleware standard used extensively in network management is the Common Object Request Broker Architecture (CORBA), which is provided by the Object Management Group (OMG). CORBA specifies a system that provides interoperability between objects in a heterogeneous, distributed environment and in a way transparent to the programmer. Its design is based on the OMG Object Model, which defines common object semantics for specifying the externally visible characteristics of objects in a standard and implementation-independent way. In this model, clients request services from objects (which will also be called servers) through a well-defined interface. This interface is specified in the OMG Interface Definition Language (IDL).

In CORBA, a client accesses an object by issuing a request to the object. The request is an event, and it carries information including an operation, the object reference of the service provider, and actual parameters, if any. The object reference is an object name that reliably defines an object.

A central component of CORBA is the Object Request Broker (ORB). The ORB encompasses the communication infrastructure necessary to identify and locate objects, handle connection management, and deliver data. In general, the ORB is not required to be a single component; it is simply defined by its interfaces. The basic functionality provided by the ORB includes passing the requests from clients to the object implementations on which they are invoked. The ORB acts as the middleware between clients and servers. In the CORBA model, a client can request a service without knowing anything about what servers are attached to the network. The various ORBs receive the requests, forward them to the appropriate servers, and then hand the results back to the client.

In CORBA, a client first looks up the object (server) it wants to communicate with. The ORB, as a result of the lookup operation, returns an object reference (a handle) of the server to the client. The client then uses the object reference to invoke operations on the object as a function call in the chosen programming language. The ORB intercepts the client request, collects the information about the operation and the request parameter values, encodes it in IIOP, and sends it to the object (server). The ORB on the object side (server) translates the request into a programming language specific function call on the server object. The server object then processes the request and returns a response, if any. The ORB intercepts the response, encodes the response and its parameters into IIOP, and sends it to the client. The ORB on the client side then returns the response to the client as the return value of the function call originally made as part of issuing the request.

GDMO (Guidelines for Definition of Managed Objects) is a standard for defining objects in a network in a consistent way. With a consistent "language" for describing such objects as workstations, LAN servers, and switches, programs can be written to control or sense the status of network elements throughout a network. GDMO prescribes how a network product manufacturer must describe the product formally so that others can write programs that recognize and deal with the product. Using GDMO with ASN1, descriptions may be made of the class or classes of the object, how the object behaves, its attributes, and classes that it may inherit.

GDMO is part of the CMIP and also the guideline for defining network objects under TMN. The object definitions created using GDMO and related tools form a Management Information Base (MIB). GDMO uses Abstract Syntax Notation One (ASN1) as the rules for syntax and attribute encoding when defining the objects. Abstract Syntax Notation One is a language that defines the way data is sent across dissimilar communication systems. ASN1 ensures that the data received is the same as the data transmitted by providing a common syntax for specifying application layer (e.g., program-to-program communications) protocols. Each communications system contains a similar ASN1 encoding/decoding scheme written in the language used on that particular system. When one system wants to send data to another, the first system encodes the data into ASN1, sends the data, and the second system receives and decodes the data using the decoder written in the language used on that system.

In response to the difficulties presented by SNMP and CMIP, the Object Management Group (OMG) and Joint Inter-Domain Management (JIDM) have defined Interface Definition Language (IDL) for network management, which is used to access object instance data and may be used across a plurality of programming languages and across a plurality of platforms. JIDM IDL allows programmers to write only one set of interfaces for a particular object across multiple programming languages, rather than having to write a new set of interfaces for each programming language. Although the use of IDL as a programming-language-independent and platform-independent interface to define CORBA services and objects greatly improves the ease with which network objects may be managed, there is a significant problem in that for each TMN object to be managed, an IDL interface must be defined and compiled. This problem leads to a great proliferation of object interfaces which must be learned to manage the network effectively. The management of such a large number of compiled object-specific interfaces requires significant memory and disk space resources and degrades the performance and scalability of management applications. Whenever a new object type is to be added to a network, the system must be shut down and recompiled with the new object interface. With the great number of object interfaces involved, compile times may be exceedingly long. Because many network management systems, especially in the field of telecommunications network management, are expected to be operable continuously with no downtime, adding or removing managed object types may become problematic.

Therefore, improved systems and methods for managing network devices are desired.

SUMMARY OF THE INVENTION

The problems outlined above are in large part solved by various embodiments of a system and method for generic and dynamic mapping of managed object metadata as disclosed herein. The framework may provide a suitable system for managed object data type conversions between various data description languages, such as an interface definition language, and an abstract syntax notation.

In one embodiment, when a CORBA client application invokes a management request on a Request Gateway, the Gateway may convert the request parameter values in IDL data types to PMI's ASN1Values. PMI (Portable Management Interface) is a proprietary C++ API that is used in developing C++ management and agent applications (managers and agents). Similarly, when the Gateway receives a response from an enterprise manager, it may convert the response parameter values in PMI's ASN1Values to values in IDL data types. This conversion facility may be used extensively in both request and event network traffic, and so in one embodiment, common libraries may be used.

In one embodiment, one of the data types may be represented in a generic interface description language which is operable to describe interfaces to managed objects across a plurality of platforms and across a plurality of programming languages, and is class independent. As used herein, the term "class independent" refers to the property that a single interface may be defined to describe substantially all data types and all managed objects. Given the number of different types of TMN objects one may need to manage on a network, having a single object interface for all of them saves significant resources in that there is no need to statically compile and store separate interfaces for the many objects, which may increase the scalability of a network management system dramatically. This also means that one may add a new object to the system without bringing the system down to compile a new interface, making it much easier to maintain system operations with little or no downtime.

Because there is potential for different mappings of IDL data types to ASN1 data types, in one embodiment, two separate libraries may be used: a converter framework library and a converter implementation library. The use of converter implementation libraries may allow various different mappings to be used easily by implementing them as plug-in modules. In one embodiment, the two libraries may include an ASN1 converter framework library and a C++ IDL-ASN1 converter implementation library. The added benefit of this approach is that the converter framework library can be reused to support conversion of ASN1 types and values to other formats like TL-1, simply by providing an appropriate converter implementation library corresponding to the IDL-ASN1 converter implementation library.

In one embodiment, the framework library provides a collection of classes that may be used by the clients of the converter libraries. Most classes in the converter framework library are handle classes (or wrappers) to the real implementation (or body) classes in the converter implementation library. Framework classes hide the details of the real implementation classes and provide a simple, consistent interface to any data type converter via IDL. The converter implementation library provides the implementation needed by the framework to function properly. In one embodiment, the converter implementation library is operable to convert data types between IDL and ASN1 types. Users of converters typically do not interact directly with the converter implementation library. Instead, as described above, they use a generic converter class of the converter framework. The converter implementation library may provide the actual data type converters.

For example, in one embodiment, C++ IDL<-->ASN1 converters may create a class IDL Value, subclass of a framework abstract class OpaqueValue, to hold C++ IDL data. The IDLValue class is a data-holder used to hold IDL values in CORBA::Any, the CORBA generic data type. Therefore, only one interface may be used for converting any data type. In an alternate embodiment, TL1<-->ASN1 converters could define their own subclasses to hold data specific to that domain. The use of a single generic primitive data type, along wvith the simple container types of set and sequence, provides an efficient, simple approach to managing managed object metadata across multiple platforms and multiple programming languages, in addition to providing a generic interface to all managed object classes.

The combination of using IDL and the generic type <any>provides an efficient, generic solution to mapping data types across multiple platforms, multiple programming languages, and multiple object classes. The fact that the framework described herein accommodates a variety of plug-in modules for mapping other data types to and from IDL further enhances the suitability of the system and method for a generic and expandable solution to data and metadata type conversions.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF SEVERAL EMBODIMENTS

Figure 1B:
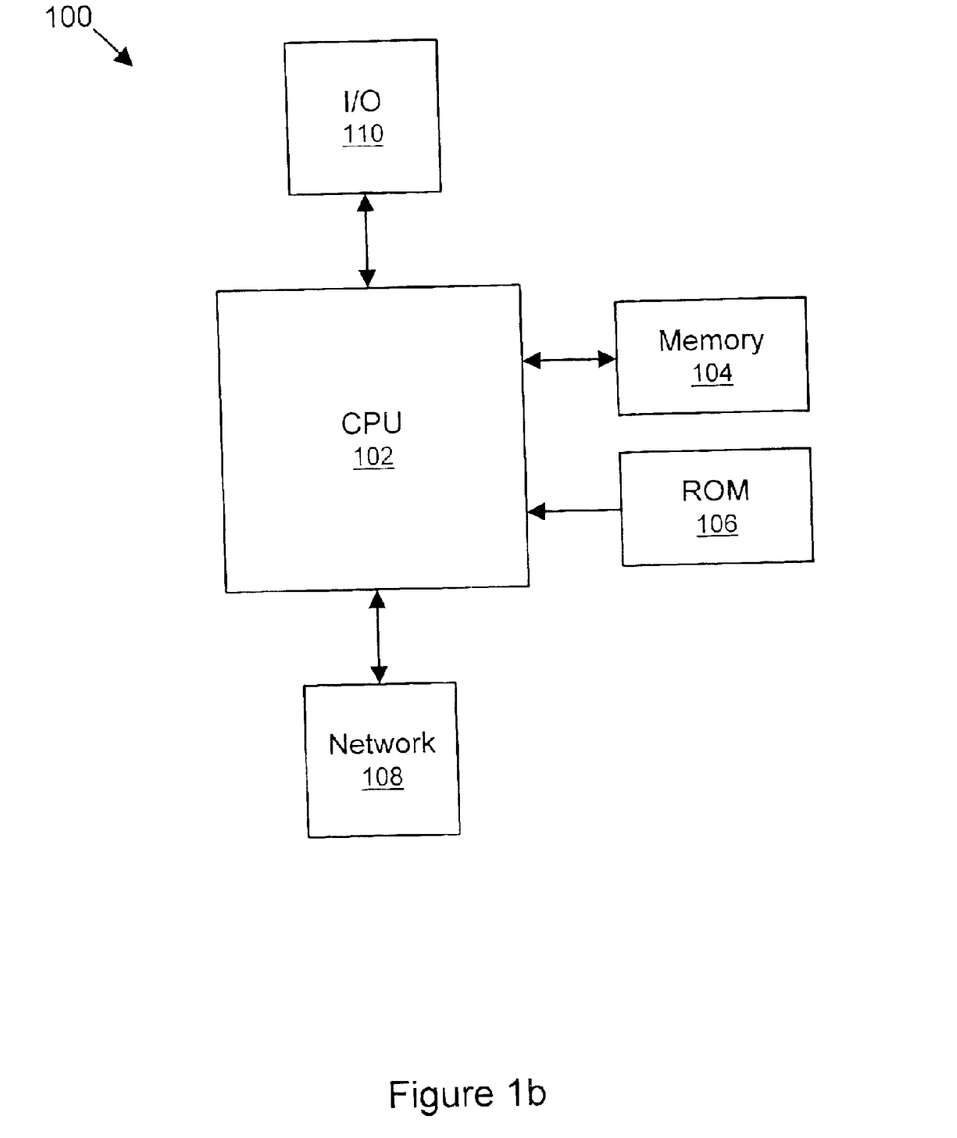
FIG. 1b is an illustration of a typical computer system architecture which is suitable for implementing various embodiments.

FIG. 1b: A Typical Computer System

Turning now to the drawings, FIG. 1b is an illustration of a typical, general-purpose computer system 100 which is suitable for implementing various embodiments of the system and method for network management as disclosed herein. The computer system 100 includes at least one central processing unit (CPU) or processor 102. The CPU 102 is coupled to a memory 104 and a read-only memory (ROM) 106. The memory 104 is representative of various types of possible memory media: for example, hard disk storage, floppy disk storage, removable disk storage, or random access memory (RAM). The terms "memory," "memory medium," and "storage medium" may include an installation medium, e.g., a CD-ROM or floppy disk, a computer system memory such as DRAM, SRAM, EDO RAM, etc., or a non-volatile memory such as a magnetic media, e.g., a hard drive or optical storage. The memory medium may include other types of memory as well, or combinations thereof. In addition, the memory medium may be located in a first computer in which the programs are executed, or may be located in a second different computer which connects to the first computer over a network. In the latter instance, the second computer provides the program instructions to the first computer for execution.

As shown in FIG. 1b, typically the memory 104 permits two-way access: it is readable and writable. The ROM 106, on the other hand, is readable but not writable. The memory 104 and/or ROM 106 may store instructions and/or data which implement all or part of the system and method described in detail herein, and the memory 104 and/or ROM 106 may be utilized to install the instructions and/or data. In various embodiments, the computer system I 00 may take various forms, including a personal computer system, desktop computer, laptop computer, palmtop computer, mainframe computer system, workstation, network appliance, network computer, Internet appliance, personal digital assistant (PDA), embedded device, smart phone, television system, or other suitable device. In general, the term "computer system" can be broadly defined to encompass any device having a processor which executes instructions from a memory medium.

The CPU 102 may be coupled to a network 108. The network 108 is representative of various types of possible networks: for example, a local area network (LAN), wide area network (WAN), or the Internet. The system and method for network management as disclosed herein may therefore be implemented on a plurality of heterogeneous or homogeneous networked computer systems 100 through one or more networks 108. The CPU 102 may acquire instructions and/or data for implementing system and method for network management as disclosed herein over the network 108.

Through an input/output bus 110, the CPU 102 may also coupled to one or more input/output devices that may include, but are not limited to, video monitors or other displays, track balls, mice, keyboards, microphones, touch-sensitive displays, magnetic or paper tape readers, tablets, styluses, voice recognizers, handwriting recognizers, printers, plotters, scanners, and any other devices for input and/or output. The CPU 102 may acquire instructions and/or data for implementing the system and method for network management as disclosed herein through the input/output bus 110.

The computer system 100 is operable to execute one or more computer programs. The computer programs may comprise operating system or other system software, application software, utility software, Java™ applets, and/or any other sequence of instructions. Typically, an operating system performs basic tasks such as recognizing input from the keyboard, sending output to the display screen, keeping track of files and directories on the disk, and controlling peripheral devices such as disk drives and printers. Application software runs on top of the operating system and provides additional functionality. Because applications take advantage of services offered by operating systems, and because operating systems differ in the services they offer and in the way they offer the services, an application must usually be designed to run on a particular operating system. The computer programs are stored in a memory medium or storage medium such as the memory 104 and/or ROM 106, or they may be provided to the CPU 102 through the network 108 or I/O bus 110.

In one embodiment, the computer programs executable by the computer system 100 may be implemented in an object-oriented programming language. In an object-oriented programming language, data and related methods can be grouped together or encapsulated to form an entity known as an object. All objects in an object-oriented programming system belong to a class, which can be thought of as a category of like objects which describes the characteristics of those objects. Each object is created as an instance of the class by a program. The objects may therefore be said to have been instantiated from the class. The class sets out variables and methods for objects which belong to that class. The definition of the class does not itself create any objects. The class may define initial values for its variables, and it normally defines the methods associated with the class (i.e., includes the program code which is executed when a method is invoked.) The class may thereby provide all of the program code which will be used by objects in the class, hence maximizing re-use of code which is shared by objects in the class.

Figure 2:
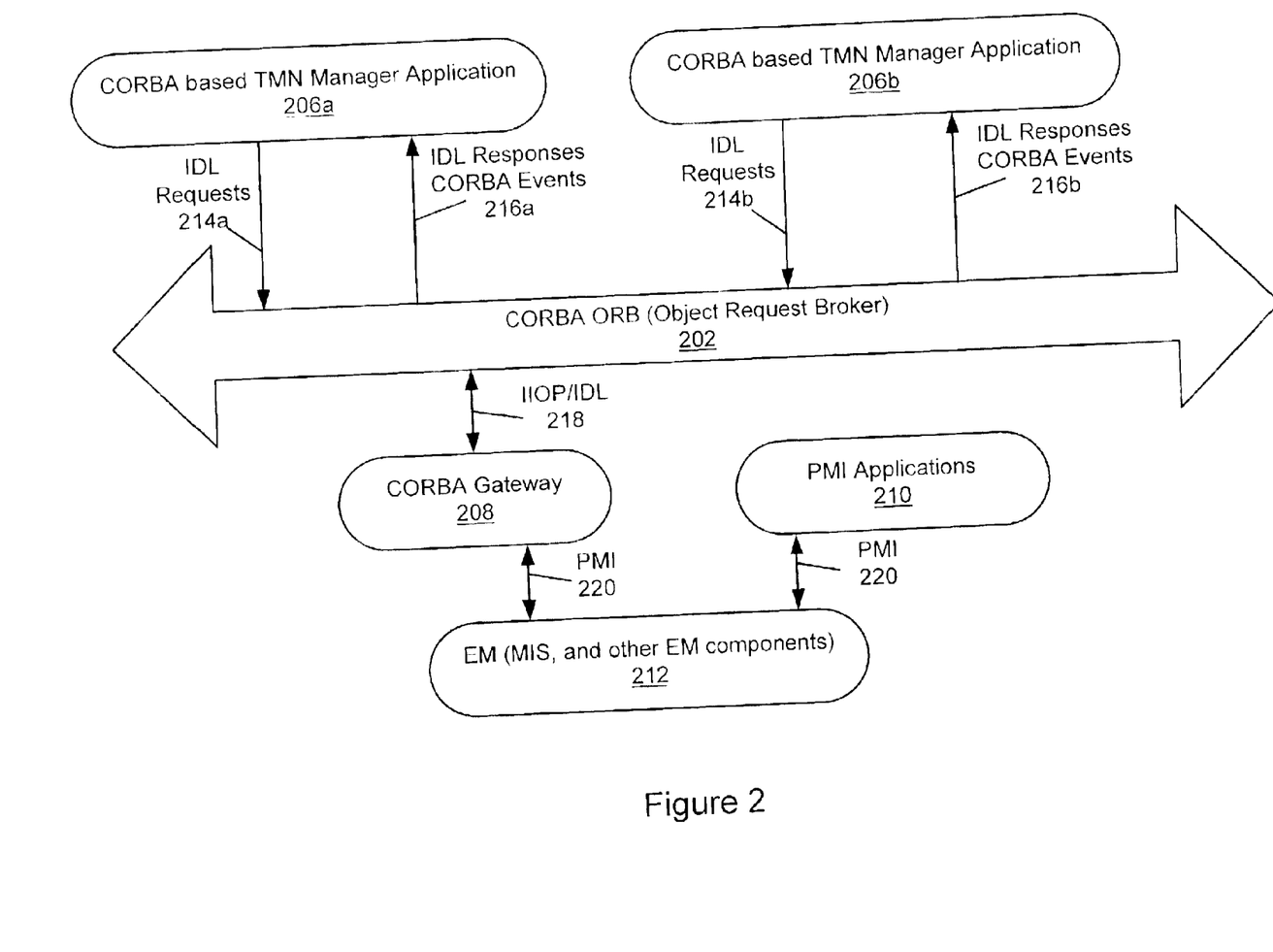
FIG. 2 is an illustration of a CORBA gateway to an enterprise manager according to one embodiment.

FIG. 2: CORBA Gateway

FIG. 2 illustrates a CORBA gateway from CORBA-based applications to an enterprise manager according to one embodiment. In one embodiment, the system may be configurable to manage various networked objects, such as printers, scanners, phone systems, copiers, and many other devices and appliances configured for network operation. For purposes of simplicity, similar components, e.g., manager applications 206a and 206b, may be referred to collectively herein by a single reference numeral, e.g., 206. As shown in FIG. 2, CORBA-based TMN manager applications 206 may be communicatively coupled to a CORBA Object Request Broker (ORB) 202. The manager applications 206 may be operable to send Interface Definition Language (IDL) requests 214 and receive IDL responses and CORBA events 216 through the CORBA ORB 202. A CORBA gateway 208 may also be communicatively coupled to the CORBA ORB 202 and be operable to communicate with the CORBA ORB 202 via communications methods 218 such as the Internet Inter-Object Protocol (IIOP), also known as the Internet Inter-ORB Protocol, and IDL. IIOP is a protocol developed by the Object Management Group (OMG) to implement CORBA solutions over the World Wide Web. Unlike HTTP, IIOP enables browsers and servers to exchange integers, arrays, and more complex objects.

In one embodiment, an enterprise manager 212 may be coupled to the CORBA gateway 208 via a proprietary or platform-dependent interface such as Portable Management Interface (PMI) 220 from Sun Microsystems, Inc. The enterprise manager 212 may include various enterprise management components such as a Management Information System (MIS), etc. Also coupled to the enterprise manager 212 via PMI 220 may be one or more PMI applications 210. PMI applications may include, for example, applications which provide access to event notification, subscription, and propagation services and access to object instance information. In one embodiment, the enterprise manager 212 may be Solstice Enterprise Manager (SEM) from Sun Microsystems, Inc., and examples of the one or more PMI applications 210 that use PMI to communicate with the SEM MIS may include SEM Viewer, SEM Alarm Manager, SEM Discovery, etc. In one embodiment, the CORBA gateway 208 may translate the CORBA manager requests 214 from IDL to PMI requests 220. Similarly, the CORBA gateway 208 may translate the enterprise manager PMI responses and PMI events 220 to IDL/IIOP responses and events 218 which may be passed on through the CORBA ORB 202 to the manager applications 206 in the form of DL responses and CORBA events 216.

In one embodiment, manager applications 206 may request information regarding managed objects on the network via the CORBA Gateway 208. The managed objects may represent devices such as cell phones, cell phone towers, phone systems, faxes, routers, switches, etc., which may be interconnected via networks. The data related to such objects may exist in a variety of formats, and so must be translated to forms readily understood by the manager applications 206. This function may be performed by a component of the CORBA Gateway 208. More specifically, a mapping system may be invoked by the CORBA Gateway 208 to translate managed object data and metadata between various data formats, such as OMG IDL and ASN1.

Figure 3:
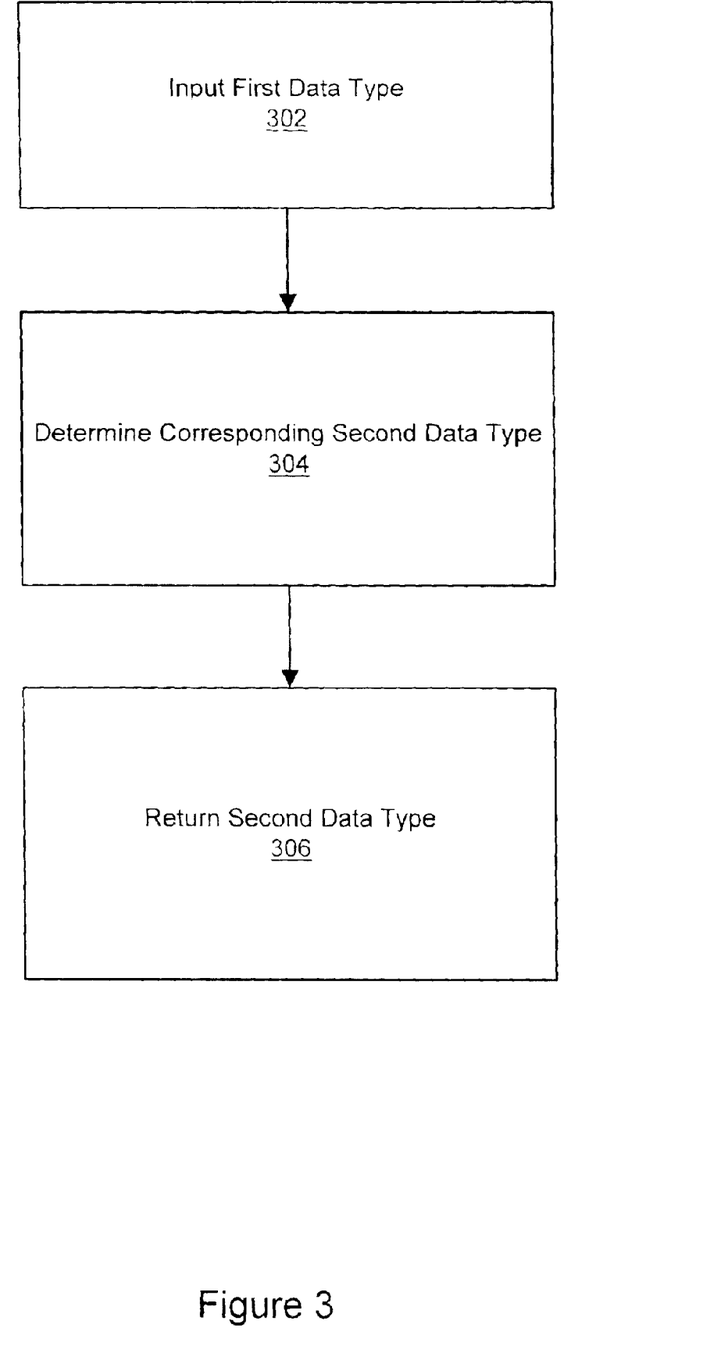
FIG. 3 is a flowchart illustrating mapping from a first data type to a second data type according to one embodiment.

FIG. 3: Mapping from a First Data Type to a Second Data Type

In one embodiment, a converter framework may provide a suitable system for managed object data type conversions between various data description languages in support of communication between the CORBA Gateway 208 and an enterprise manager 212. For example, when a manager application 212 initiates a request on the CORBA Gateway 208, the Gateway 208 may convert the request parameter values in IDL data types to PMI's ASN1Values. Similarly, when the Gateway 208 receives a response from an enterprise manager 212, it may convert the response parameter values in PMI's ASN1 Values to values in IDL data types.

FIG. 3 illustrates the steps involved in mapping a first data type to a second data type according to one embodiment. For example, an IDL integer type may be mapped to a corresponding ASN1 integer type. In one embodiment, this mapping may be enabled by a converter framework. In one embodiment, the data to be mapped may include type information about an attribute, action, or notification of a managed object. In step 302, the first data type is entered into the mapping system. In step 304, the corresponding second data type is determined. In one embodiment, determining the corresponding second data type may be accomplished via a lookup table. Finally, in step 306, the second data type is returned. In this manner, data types related to the attributes, events, or other parameters of managed objects may be converted between various data description languages, such as OMG IDL and ASN1.

In one embodiment, one of the data types is represented in a generic interface description language which is operable to describe interfaces to managed objects across a plurality of platforms and across a plurality of programming languages, and is class independent. As used herein, the term "class independent" refers to the property that a single interface may be defined to describe substantially all data types and all managed objects. The benefits of having a generic interface to managed object data types are substantial. Given the number of different types of TMN objects one may need to manage on a network, having a single object interface for all of them saves significant resources in that there is no need to statically compile and store separate interfaces for the many objects, which may increase the scalability of a network management system dramatically. This also means that one may add a new object to the system without bringing the system down to compile a new interface, making it much easier to maintain system operations with little or no downtime.

For example, the first data type may be a complex object data type in GDMO/ASN1, which may be mapped to a sequence of a generic primitive data type in IDL, such as the <any>data type. As another example, the complex ASN1 object data type may be mapped to a choice structure in IDL, where the choice structure includes a generic value field (<any>), a plurality of data types, and a selector index, whereby the appropriate data type of the generic value may be determined. Alternately, the converse of the above mappings may be performed.

Figure 4:
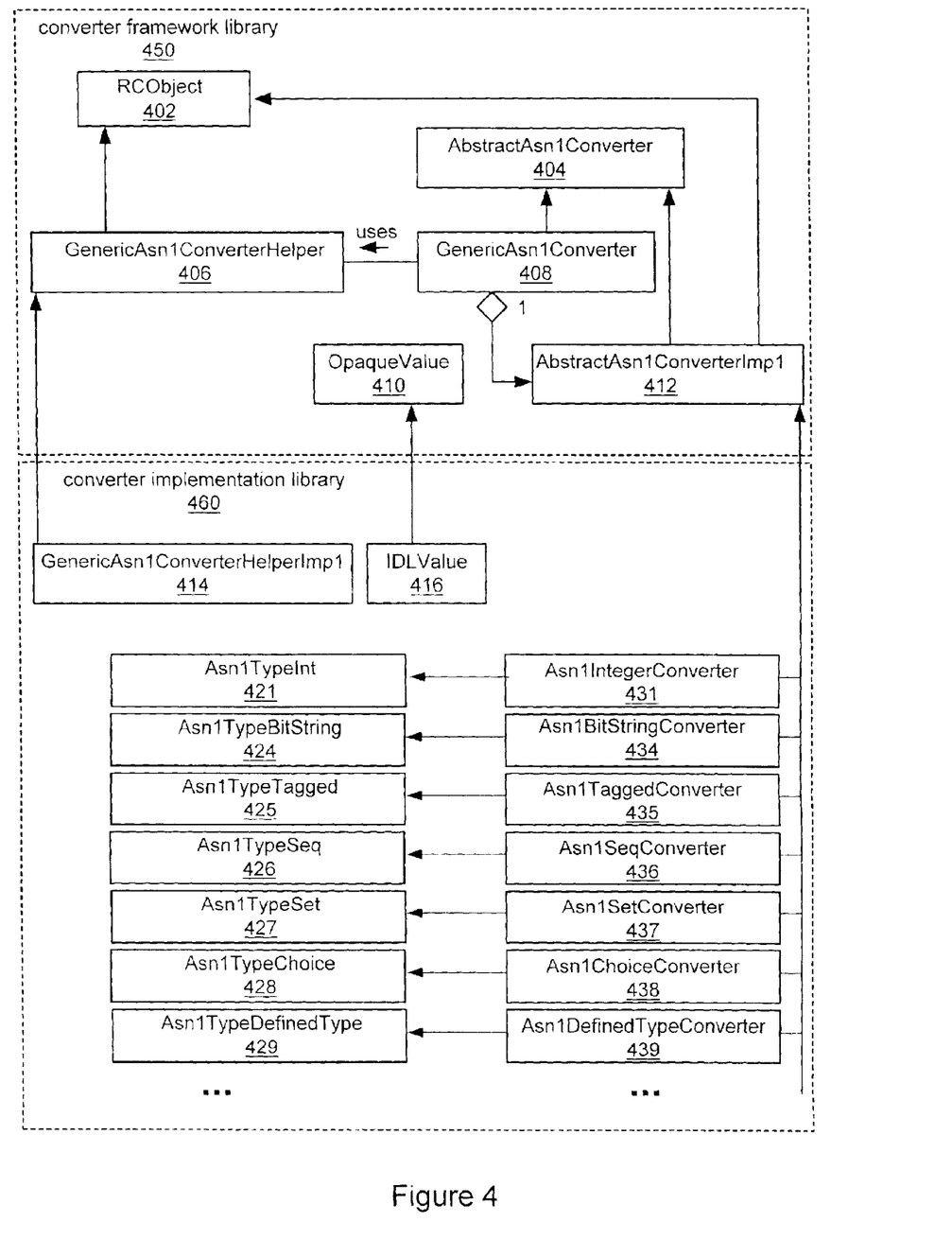
FIG. 4 is an object inheritance diagram of an IDL-ASN1 Converter Framework according to one embodiment.

FIG. 4: IDL-ASN1 Converter Framework Object Inheritance Diagram

FIG. 4 illustrates IDL-ASN1 converter framework object inheritance according to one embodiment. This framework may provide a suitable system for managed object data type conversions between various data description languages. In one embodiment, when a CORBA client application 206 invokes a management request on the Gateway 208, the Gateway 208 may convert the request parameter values in IDL data types to PMI's ASN1Values. Similarly, when the Gateway 208 receives a response from an enterprise manager, it may convert the response parameter values in PMI's ASN1Values 30 to values in IDL data types. This conversion facility may be used extensively in both request and event network traffic, and so in one embodiment, common libraries may be used.

Because there is potential for different mappings of IDL data types to ASN1 data types, in one embodiment, two separate libraries may be used: a converter framework library and a converter implementation library. The use of converter implementation libraries may allow various different mappings to be used easily by implementing them as plug-in modules. In one embodiment, the two libraries may include an ASN1 converter framework library 450 and a C++ IDL-ASN1 converter implementation library 460. The added benefit of this approach is that the converter framework library 450 can be reused to support conversion of ASN1 types and values to other formats like TL-1, simply by providing an appropriate converter implementation library corresponding to the IDL-ASN1 converter implementation library 460.

In one embodiment, the converter framework and converter implementation may be designed as multi-threaded programs. The term "multi-threaded" means that various processes, or threads, of a program may execute concurrently. In one embodiment, this feature is accommodated by the operating system under which the program runs.

Converter Framework Library

In one embodiment, the framework library 450 is essentially a collection of classes that may be used by the clients of the converter libraries. Most classes in the converter framework library are handle classes (or wrappers) to the real implementation (or body) classes in the converter implementation library 460. Framework classes hide the details of the real implementation classes and provide a simple, consistent interface to any data type converter.

Referring to FIG. 4, RCObject 402 is the base class for all other classes in the system in one embodiment. RCObject 402 may provide a reference-counting capability, and any real (implementation) converters are preferably inherited from this class. As FIG. 4 shows, the framework classes which inherit directly from RCObject 402 are the AbstractASN1ConverterImpl 412 and the GenericASN1ConverterHelper 406. Note that AbstractASN1ConverterImpl 412 also inherits from AbstractASN1Converter 404, as does GenericASN1Converter 408, which uses GenericASN1ConverterHelper 406. The AbstractASN1Converter class 404 is intended to be an interface class and hence is an abstract class, i.e., no concrete instance of this class may exist. Similarly, OpaqueValue 410 is intended to be an interface class with no concrete instantiations. OpaqueValue 410 is a data-holder for data of any type.

For example, in one embodiment, C++ IDL<-->ASN1 converters may create a class IDLValue 416, subclass of OpaqueValue 410, to hold C++ IDL data. In an alternate embodiment, TL1<-->ASN1 converters could define their own subclasses to hold data specific to that domain.

In one embodiment, AbstractASN1ConverterImpl 412 is an abstract base class to be inherited by the real (implementation) converters. GenericASN1Converter 408 is a concrete class that is used primarily by clients of the converter libraries. Generally, users do not need to know the exact converter they are dealing with. Instead, they may use GenericASN1Converter to convert values to and from ASN1 format through IDL. GenericASN1Converters are typically created per registered attribute or event or action types. GenericASN1Converters may also be created for non-registered types (or types that may not have an Object ID). Primarily, their usage is restricted to the converter library implementation.

GenericASN1Converter 408 constructors may act like virtual constructors. Based on an Object ID or type, they may use GenericASN1ConverterHelper 406 to create the real converter. That is, the helper may help the framework create the actual converters (such as Boolean converters, etc.). GenericASN1ConverterHelper 406 may provide a method to create an appropriate converter based on the ASN1Type it receives.

Note that GenericASN1ConverterHelper 406 may be an abstract base class to be implemented by the real converter library. The implementation helper may help create real converters based on the ASN1Type. When one of the GenericASN1Converter 408 constructors is invoked, GenericASN1Converter 408 may invoke a type lookup method, if necessary, to get the relevant ASN1Type object. Then, GenericASN1Converter 408 may invoke a GenericASN1ConverterHelper 406 method to create the actual converter corresponding to that ASN1Type object. The actual converter is then used to convert the data type.

Converter Implementation Library

Referring to FIG. 4, the converter implementation library 460 preferably provides the implementation needed by the framework to function properly. In one embodiment, the converter implementation library is operable to convert data types between IDL and ASN1 types. Users of converters typically do not interact directly with the converter implementation library 460. Instead, as described above, they use the GenericASN1Converter class 408 of the converter framework. The converter implementation library 460 may provide various data type converters. The design of each of these converters is similar.

As shown in FIG. 4 and described above, the IDLValue class 416 may be derived from the generic type class OpaqueValue 410, and the GenericASN1 ConverterHelperImpl 414 helper class may be derived from the abstract GenericASN1ConverterHelper 406 class, according to one embodiment. Furthermore, each of the type converter implementation classes may be derived from the AbstractASN1ConverterImpl 412 class, as well as from each converter's specific ANS1 type class. For example, ASN1IntegerConverter 431 may be derived from the AbstractASN1ConverterImpl class 412, as well as the ASN1TypeInt class 421, according to one embodiment.

As mentioned above, IDLValue class 416 is a data-holder used to hold IDL values in CORBA::Any, the CORBA generic data type. Therefore, only one interface may be used for converting any data type. IDLValue class does not have any significance other than to hold the IDL data and provide a uniform interface. CORBA::Any's copy constructor and assignment operator use deep-copy semantics, thus making it prohibitive to use a non-reference (non-pointer) member. The use of a single generic primitive data type, along with the simple container types of set and sequence, provides an efficient, simple approach to managing managed object metadata across multiple platforms and multiple programming languages.

In one embodiment, GenericASN1ConverterHelperImpl 414 may provide the implementation of GenericASN1ConverterHelper 406 abstract base class. GenericASN1ConverterHelperImpl 414 may generate the particular converters used by the client. For example, in one embodiment, ASN1IntegerConverter 431 is an actual converter that is capable of converting values between ASN1 INTEGER and IDL INTEGER types. The user typically creates a GenericASN1Converter 408 for, say, an INTEGER attribute. GenericASN1Converter 408 will utilize GenericASN1ConverterHelper 406 to create the ASN1IntegerConverter 431 object. Then the user may invoke the relevant convert method of GenericASN1Converter 408. GenericASN1Converter 408, in turn, may delegate that request to ASN1IntegerConverter 431. Note that ASN1IntegerConverter 431 cannot be created on the stack. It must be created on the heap because it is a reference counted object, and therefore, the create method is static.

Consider the conversion process for a complex data type, such as the ASN1 SET OF type. For example, to convert an attribute whose ASN1 type is SET OF INTEGER, the user typically creates the GenericASN1Converter 408 for this attribute. ASN1 SET OF is mapped to IDL sequence<any>. The 'any' in the sequence contains the DDL integer. When the user wants to convert values from IDL sequence<any>to ASN1 SET OF INTEGER, the GenericASN1Converter 408 converter method may be invoked. This method, in turn, may invoke the ASN1SeqOfConverter converter method. Since ASN1 SETOF is a constructed type, it may get the contained type. From that type, it may create a GenericASN1Converter 408 (for the contained type). Then the ASN1SeqOfConverter converter method may invoke the GenericASN1Converter 408 converter method on the contained type. Since the contained type happens to be a simple type INTEGER, this method may eventually invoke the ASN1IntegerConverter 431 converter method on the indexed element of the sequence. The integer converter is operable to convert values to ASN1, at which point recursion ends. The other complex types typically use the same pattern as described above, using recursive invocations of convert methods on the contained or referred types until the simple types are reached.

Figure 5:
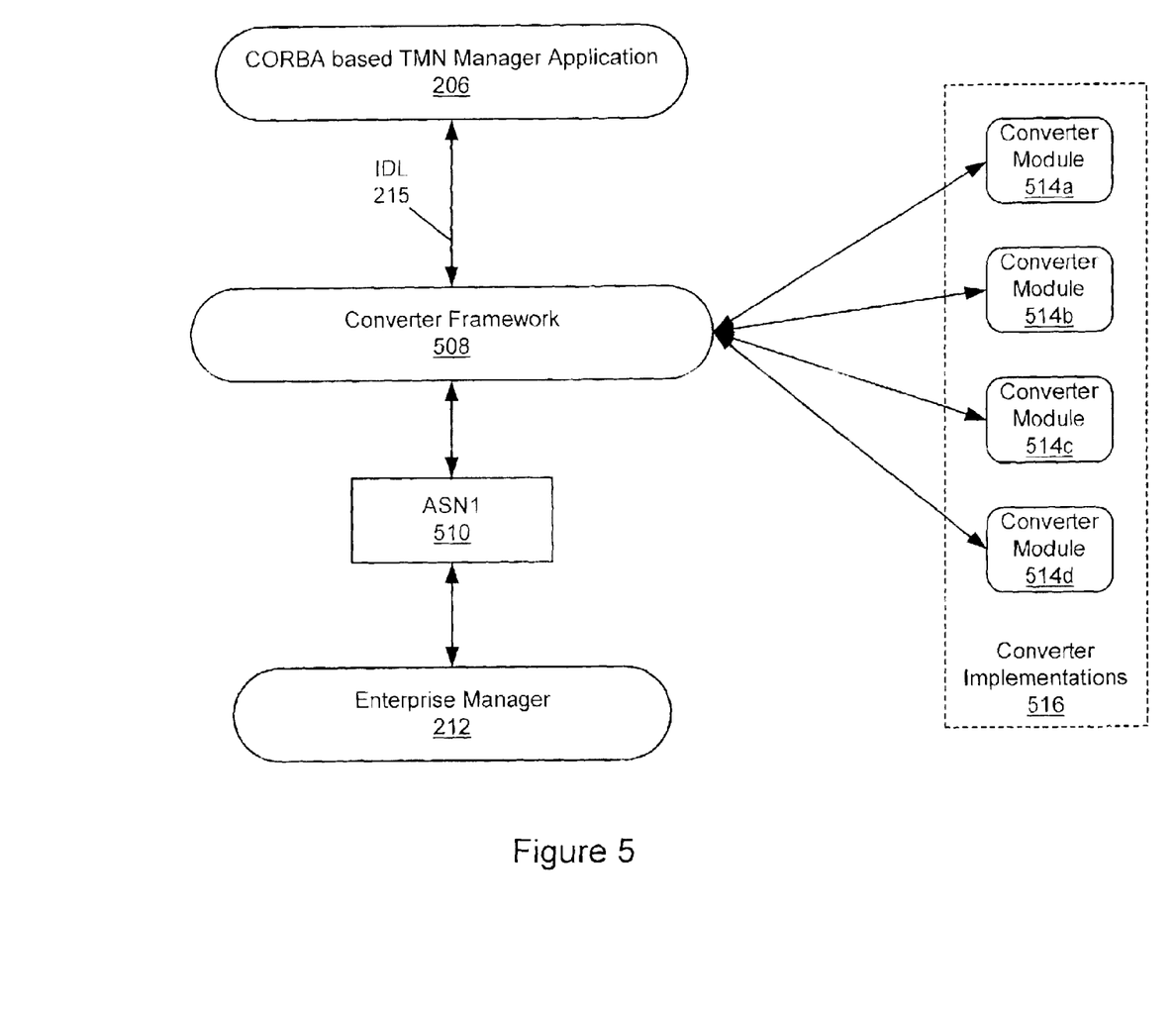
FIG. 5 is a diagram of an IDL-ASN1 Converter Framework with Converter Modules according to one embodiment.

FIG. 5: Converter Framework with Converter Modules

FIG. 5 illustrates a converter framework 508 and converter implementations 516 which may respectively correspond to converter framework library 450 and converter implementation library 460 according to one embodiment. Converter implementations 516 may include various converter modules 514a–514d. As FIG. 5 shows, in one embodiment, a manager application 206 (as shown in FIG. 2) is communicatively coupled to the converter framework 508, via an interface definition language, such as IDL 214. The converter framework 508 is coupled to the various converter modules 514a–514d of the converter implementations 516. The converter framework 508 is further coupled to an enterprise manager 212 (as shown in FIG. 2), such as the Solstice Enterprise Manager™ (SEM) available from Sun Microsystems, Inc, through an abstract syntax notation or other metadata notation language, such as ASN1 510.

In one embodiment, the converter modules 514a–514d are plug-in modules which are operable to plug into the converter framework 508, as discussed with reference to FIG. 4. The converter modules 514a–514d may then provide various functional mappings of managed object metadata between the interface definition language and the abstract syntax notation as invoked by the converter framework 508. In one embodiment, each converter module 514a–514d may be operable to map managed object metadata types between IDL 214 and ASN1 510, according to that module's particular mapping. In an alternate embodiment, a converter module 514a–514d may map managed object metadata types between IDL and a transaction language, such as Transaction Language One (TL1).

The combination of using IDL and the generic type <any>provides an efficient, generic solution to mapping data types across multiple platforms, multiple programming languages, and multiple object classes. The fact that the framework described herein may accommodate a variety of plug-in modules for mapping other data types to and from IDL further enhances the suitability of the system and method for a generic and expandable solution to data and metadata type conversions.

Various embodiments may further include receiving or storing instructions and/or data implemented in accordance with the foregoing description upon a carrier medium. Suitable carrier media may include storage media or memory media such as magnetic or optical media, e.g., disk or CD-ROM, as well as transmission media or signals such as electrical, electromagnetic, or digital signals, conveyed via a communication medium such as network 108 and/or a wireless link.

While the present invention has been described with reference to particular embodiments, it will be understood that the embodiments are illustrated and that the invention scope is not so limited. Any variations, modifications, additions and improvements to the embodiments described are possible. These variations, modifications, additions and improvements may fall within the scope of the invention as detailed within the following claims.

What is claimed is:

1. A network management system comprising:
    a plurality of plug-in mapping modules, wherein each of the plurality of plug-in mapping modules is operable to provide a unique mapping for a set of managed object data types between the same two languages for describing data associated with managed objects, wherein one of the two languages is an interface definition language (IDL) and the other of the two languages is an abstract syntax notation, wherein the interface definition language comprises a language for defining interfaces to managed objects across a plurality of platforms and across a plurality of programming languages, wherein the managed objects comprise instances of the managed object data types, and wherein the abstract syntax notation comprises a language for describing data; and
    a mapping framework, wherein the mapping framework is operable to receive the plurality of plug-in mapping modules, and wherein the mapping framework is operable to provide access to the plurality of plug-in mapping modules to facilitate the mapping of managed object data types in accordance with the mappings for managed object data types provided by the plurality of mapping modules.

2. The system of claim 1, wherein the managed objects comprise a telephone system.

3. The system of claim 1, wherein the managed objects comprise a network switch.

4. The system of claim 1, wherein the mapping framework comprises a plurality of processes which are concurrently executable.

5. The system of claim 1, wherein the interface definition language is operable to provide a single mapping which is applicable to any managed object class.

6. The system of claim 1, wherein the abstract syntax notation comprises Abstract Syntax Notation One (ASN1).

7. The system of claim 1,
    wherein the mapping framework comprises a converter framework library, wherein the converter framework library comprises a set of abstract classes which provide an interface for the one or more plug-in mapping modules, and wherein the interface comprises wrappers to a plurality of corresponding converter implementation classes; and
    wherein a converter implementation library comprises the one or more plug-in mapping modules, wherein the one or more plug-in mapping modules comprise the plurality of converter implementation classes, and wherein the converter implementation classes provide mappings for the managed object data types between the interface definition language and the abstract syntax notation.

8. The system of claim 7, wherein the converter framework library comprises an ASN1 converter framework library, and wherein the ASN1 converter framework library provides an interface to map managed object data types between ASN1 and the interface definition language.

9. The system of claim 7, wherein the converter implementation library comprises a C++ IDL to ASN1 converter implementation library, and wherein the C++ IDL to ASN1 converter implementation library comprises C++ classes and functions to map managed object data types between ASN1 and the interface definition language.

10. The system of claim 7, wherein the converter framework library comprises a collection of classes, and wherein the classes comprise wrappers to corresponding implementation classes in the converter implementation library.

11. A method for managing a network, the method comprising:
    selecting a first mapping module from a plurality of plug-in mapping modules, wherein each of the plurality of mapping modules is operable to provide a unique mapping between a first set of data types and a second set of data types;

inputting a first data type from a the first set of data types, wherein the first set of data types is expressed in an abstract syntax notation, and wherein the abstract syntax notation comprises a language for describing data;

determining a corresponding second data type from a the second set of data types according to a first mapping provided by a first mapping module, wherein the second set of data types is expressed in an interface definition language (IDL), wherein the interface definition language comprises a language for defining interfaces to managed objects across a plurality of platforms and across a plurality of programming languages, wherein the interface definition language is class independent, and wherein a mapping framework is operable to receive a plurality of plug-in mapping modules including the first mapping module, wherein the plurality of plug-in mapping modules are operable to provide a plurality of mappings for managed object data types between the interface definition language and the abstract syntax notation, and wherein the managed objects comprise instances of the managed object data types; and returning the second data type.

12. The method of claim 11, wherein the mapping framework comprises an abstract converter implementation class, wherein the abstract converter implementation class comprises a superclass for a type-specific converter implementation class in each of the plurality of plug-in mapping modules, wherein the type-specific converter implementation classes are operable to convert specific managed object data types between the interface definition language and the abstract syntax notation.

13. The method of claim 12, wherein the abstract converter implementation class comprises an abstract ASN1 converter implementation class, wherein the abstract ASN1 converter implementation class comprises an interface class, wherein the interface class comprises a super-class of one or more ASN1 converter implementation classes which are operable to map managed object data types between ASN1 and the interface definition language.

14. The method of claim 11, wherein the mapping framework comprises an abstract value class, wherein the abstract value class comprises a superclass for a generic value class in each of the plurality of plug-in mapping modules, wherein the generic value classes are operable to hold values in an abstract syntax notation generic type.

15. The method of claim 14, wherein the generic value classes comprise an IDL value class, wherein the IDL value class is operable to hold IDL values in an abstract syntax notation generic type.

16. The method of claim 11, wherein the mapping framework comprises an abstract generic converter helper class, wherein the abstract generic converter helper class comprises a superclass for a generic converter helper implementation class in each of the plurality of plug-in mapping modules, wherein the generic converter helper implementation classes are operable to create actual converters based on data types.

17. The method of claim 16, wherein the abstract generic converter helper class comprises an abstract generic ASN1 converter helper class, wherein the abstract generic ASN1 converter helper class comprises a super-class of one or more ASN1 converter implementation helper classes which are operable to create actual converters based on ASN1 Types.

18. The method of claim 16, wherein each of the plurality of plug-in mapping modules comprises a generic converter helper implementation class, wherein the generic converter helper implementation class is a subclass of the abstract generic converter helper class, wherein the generic converter helper implementation class is operable to create actual converters based on data types.

19. A carrier medium comprising program instructions for managing a network, wherein the program instructions are computer-executable to implement:

selecting a first mapping module from a plurality of plug-in mapping modules, wherein each of the plurality of mapping modules is operable to provide a unique mapping between a first set of data types and a second set of data types;

inputting a first data type from a the first set of data types, wherein the first set of data types is expressed in an abstract syntax notation, and wherein the abstract syntax notation comprises a language for describing data;

determining a corresponding second data type from a the second set of data types according to a first mapping provided by a first mapping module, wherein the second set of data types is expressed in an interface definition language (IDL), wherein the interface definition language comprises a language for defining interfaces to managed objects across a plurality of platforms and across a plurality of programming languages, wherein the interface definition language is class independent, and wherein a mapping framework is operable to receive a plurality of plug-in mapping modules including the first mapping module, wherein the plurality of plug-in mapping modules are operable to provide a plurality of mappings for managed object data types between the interface definition language and the abstract syntax notation, and wherein the managed objects comprise instances of the managed object data types; and returning the second data type.

20. The carrier medium of claim 19, wherein the mapping framework comprises an abstract converter implementation class, wherein the abstract converter implementation class comprises a superclass for a type-specific converter implementation class in each of the plurality of plug-in mapping modules, wherein the type-specific converter implementation classes are operable to convert specific managed object data types between the interface definition language and the abstract syntax notation.

21. The carrier medium of claim 20, wherein the abstract converter implementation class comprises an abstract ASN1 converter implementation class, wherein the abstract ASN1 converter implementation class comprises an interface class, wherein the interface class comprises a super-class of one or more ASN1 converter implementation classes which are operable to map managed object data types between ASN1 and the interface definition language.

22. The carrier medium of claim 19, wherein the mapping framework comprises an abstract value class, wherein the abstract value class comprises a superclass for a generic value class in each of the plurality of plug-in mapping modules, wherein the generic value classes are operable to hold values in an abstract syntax notation generic type.

23. The carrier medium of claim 22, wherein the generic value classes comprise an IDL value class, wherein the IDL value class is operable to hold IDL values in an abstract syntax notation generic type.

24. The carrier medium of claim 19, wherein the mapping framework comprises an abstract generic converter helper class, wherein the abstract generic converter helper class comprises a superclass for a generic converter helper implementation class in each of the plurality of plug-in mapping modules, wherein the generic converter helper implementation classes are operable to create actual converters based on data types.

25. The carrier medium of claim 24, wherein the abstract generic converter helper class comprises an abstract generic ASN1 converter helper class, wherein the abstract generic ASN1 converter helper class comprises a super-class of one or more ASN1 converter implementation helper classes which are operable to create actual converters based on ASN1 Types.

26. The carrier medium of claim 24, wherein each of the plurality of plug-in mapping modules comprises a generic converter helper implementation class, wherein the generic converter helper implementation class is a subclass of the abstract generic converter helper class, wherein the generic converter helper implementation class is operable to create actual converters based on data types.

27. A method for network management, comprising:

providing a mapping framework which comprises one or more abstract classes;

implementing a plurality of plug-in mapping modules, wherein each of the plurality of plug-in mapping modules is operable to provide a unique mapping for a set of managed object types between the same two languages for describing data associated with managed objects, wherein one of the two languages is an interface definition language (IDL) and the other of the two languages is an abstract syntax notation, wherein the managed objects comprise instances of the managed object data types, wherein the abstract syntax notation comprises a language for describing data, wherein the interface definition language comprises a language for defining interfaces to managed objects across a plurality of platforms and across a plurality of programming languages, and wherein the interface definition language is class independent; and converting managed object data types between an interface definition language and an abstract syntax notation using one of the plug-in mapping modules.

28. The method of claim 27, wherein the abstract classes comprise an abstract converter implementation class, wherein said implementing comprises creating one or more implementation classes as subclasses of the one or more abstract classes in the mapping framework, wherein said creating comprises creating a type-specific converter implementation class as a subclass of the abstract converter implementation class, and wherein the type-specific converter implementation class is operable to convert a managed object data type between the interface definition language and the abstract syntax notation.

29. The method of claim 27, wherein the abstract classes comprise an abstract value class, wherein said implementing comprises creating one or more implementation classes as subclasses of the one or more abstract classes in the mapping framework, wherein said creating comprises creating a generic value class as a subclass of the abstract value class, and wherein the generic value class is operable to hold interface definition language values in an abstract syntax notation generic type.

30. The method of claim 27, wherein the abstract classes comprise an abstract generic converter helper class, wherein said implementing comprises creating one or more implementation classes as subclasses of the one or more abstract classes in the mapping framework, wherein said creating comprises creating a generic converter helper implementation class as a subclass of the abstract generic converter helper class, and wherein the generic converter helper implementation class is operable to create actual converters based on abstract syntax notation data types.

* * * * *

UNITED STATES PATENT AND TRADEMARK OFFICE
CERTIFICATE OF CORRECTION

PATENT NO. : 6,813,770 B1
DATED : November 2, 2004
INVENTOR(S) : Sai V. Allavarpu and Rajeev Angal

It is certified that error appears in the above-identified patent and that said Letters Patent is hereby corrected as shown below:

Column 15,
Lines 1 and 5, between "from" and "the", please delete "a".

Column 16,
Lines 14 and 18, between "from" and "the", please delete "a".

Signed and Sealed this

Fifth Day of April, 2005

JON W. DUDAS
*Director of the United States Patent and Trademark Office*